United States Patent
Wu

(10) Patent No.: US 6,957,572 B1
(45) Date of Patent: Oct. 25, 2005

(54) APPARATUS AND METHODS FOR MEASURING MUD SLOWNESS IN A BOREHOLE

(75) Inventor: Peter T. Wu, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 61 days.

(21) Appl. No.: 10/710,128

(22) Filed: Jun. 21, 2004

(51) Int. Cl.[7] ............................................. E21B 49/00
(52) U.S. Cl. ................................................ 73/152.16
(58) Field of Search ....................... 73/152.16, 152.54, 73/152.55, 152.58; 367/25

(56) References Cited

U.S. PATENT DOCUMENTS

| | | |
|---|---|---|
| 4,131,875 A | 12/1978 | Ingram |
| 4,594,691 A | 6/1986 | Kimball et al. |
| 4,606,014 A | 8/1986 | Winbow et al. |
| 4,633,449 A | 12/1986 | Ingram et al. |
| 4,698,793 A | 10/1987 | Wu |
| 4,779,236 A | 10/1988 | Sondergeld |
| 4,791,619 A | 12/1988 | Liu |
| 4,797,859 A | 1/1989 | Hornby |
| 4,809,236 A | 2/1989 | Hsu et al. |
| 4,813,028 A * | 3/1989 | Liu .............................. 367/31 |
| 5,036,945 A | 8/1991 | Hoyle et al. |
| 5,265,067 A | 11/1993 | Chang |
| 5,278,805 A | 1/1994 | Kimball |
| 5,587,966 A | 12/1996 | Kimball et al. |
| 5,687,138 A | 11/1997 | Kimball et al. |
| 5,999,484 A | 12/1999 | Kimball et al. |
| 6,327,538 B1 | 12/2001 | Chin |
| 6,449,560 B1 | 9/2002 | Kimball |
| 6,459,993 B1 | 10/2002 | Valero et al. |
| 6,552,962 B1 * | 4/2003 | Varsamis et al. ............. 367/25 |
| 6,631,327 B2 | 10/2003 | Hsu et al. |
| 6,654,688 B1 | 11/2003 | Brie et al. |
| 2003/0185100 A1 | 10/2003 | Dangelo et al. |
| 2004/0001389 A1 | 1/2004 | Tang |
| 2004/0006428 A1 | 1/2004 | Hsu et al. |

* cited by examiner

*Primary Examiner*—Robert Raevis
(74) *Attorney, Agent, or Firm*—Victor H. Segura; Brigitte L. Echols; Dale Gaudier

(57) ABSTRACT

A method for determining mud slowness of a mud in a borehole includes determining slowness as a function of frequency for at least one fluid mode from a set of measurements acquired with a sonic tool in the borehole; and determining the mud slowness from the slowness as a function of frequency for the at least one fluid mode. A downhole sonic tool includes a transmitter capable of generating signals covering a frequency range, a high end of which is more than 30 KHz; and a receiver array comprising a plurality of receivers, which are responsive to the frequency range of the transmitter, wherein the transmitter and the receiver array are spaced apart on a tool body at a selected TR spacing.

16 Claims, 10 Drawing Sheets

APPARATUS AND METHODS FOR MEASURING MUD SLOWNESS IN A BOREHOLE

BACKGROUND OF INVENTION

1. Field of the Invention

The invention relates generally to formation logging using a sonic tool. More particularly, this invention relates to methods and apparatus for sonic logging that can provide accurate determination of mud slowness.

2. Background Art

Sonic well logs are typically derived from measurements made with tools suspended in a mud-filled borehole by a cable. The tools typically include a sonic source (transmitter) and a plurality of receivers in a receiver array. The receivers in the receiver array are typically spaced apart by several inches or feet. In operation, a sonic signal is transmitted from one longitudinal end of the tool and received at the other, and measurements are made every few inches as the tool is slowly drawn up the borehole. The sonic signal from the transmitter or source enters the formation adjacent the borehole, and the arrival times and other characteristics of the receiver responses are then used to find formation parameters.

Sonic logs commonly used in the art include the slowness-time coherence (STC) log. Details of the techniques used to produce an STC log are described in U.S. Pat. No. 4,594,691 issued to Kimball et al. (the '691 patent), as well as in Kimball, et al., "*Semblance Processing of Borehole Acoustic Array Data*," Geophysics, Vol. 49, No. 3, (March 1984), pp. 274–281. The '691 patent is hereby incorporated by reference in its entirety. In accordance with a method disclosed in the '691 patent, a set of time windows is applied to the compressional, shear, and Stoneley waveforms collected by an array of receivers. The time windows are determined by two parameters: the assumed arrival time at the first receiver, and an assumed slowness. For a range of arrival times and slowness, a scalar semblance is computed for the windowed waveform segments by back-propagating and stacking the waveforms and comparing the stacked energies to the unstacked energies. The semblance may be plotted as a contour plot with slowness and arrival times as the axes, with maximum semblance values indicating the determined form ation slowness value.

The STC log disclosed in the '691 patent works well for non-dispersive waves, but it is not optimal for dispersive waves. U.S. Pat. No. 5,278,805 issued to Kimball (the '805 patent) disclosed an improved method that is particularly suitable for dispersive wave analysis. This method is referred to as the dispersive slowness-time-coherence (DSTC) method, which may be used to process quadrupole signals for formation shear slowness from LWD sonic tools. See Kimball, Geophysics, Vol. 63, No. 2, March–April, 1998. The DSTC method is a model-based approach in which a set of model dispersion curves are used to determine which model dispersion curve maximizes the semblance of the back-propagated signals. DSTC analysis typically uses a concentric cylindrical layer model to represent an LWD or wireline sonic tool centered in OLE_LINK2a fluid-filled borehole within a uniform formation OLE_LINK2. However, the method does not have to use a simple concentric cylindrical layer model. If necessary, more complex model may also be used.

The formation shear slowness is one of the model parameters that are used to generate the set of dispersion curves. In accordance with the DSTC method, once the best match dispersion curve is found, the formation shear slowness is determined from the best match dispersion curve. However, the model dispersion curves depend not only on the formation shear slowness (DTs), but also on nine other model parameters: formation compressional slowness (DTc), formation density ($\rho b$), mud slowness (DTm), mud density ($\rho m$), hole diameter (HD), the equivalent outer diameter of the tool (OD) assuming the tool ID is fixed, collar density ($\rho st$), collar compressional slowness (DTc_st), and collar shear slowness (DTs_st). The DSTC method as disclosed in the '805 patent assumes all these nine parameters are known and uses them to generate a set of dispersion curves as a function of formation shear slowness, DTs. The first five of these nine parameters are related to the formation and borehole properties, while and the last four parameters are related to the collar properties. For a given collar size, the collar parameters are constants, which can be measured or pre-calibrated. On the other hand, the formation/borehole parameters are variables, changing from depth to depth and from well to well. The variable formation/borehole parameters can affect the accuracy of the formation shear slowness (DTs) determined by the DSTC method.

Among the formation/borehole parameters, the mud slowness (DTm) has been found to have the most impact on the accuracy of shear slowness (DTs) calculated from the DSTC processing. Without accurate determination of the mud slowness (DTm), it is difficult to obtain accurate shear slowness (DTs) with DSTC processing, even if high quality measurement data (waveforms) with good signal-to-noise ratio are available. Therefore, accurate determination of mud slowness (DTm) is of prime importance and should be included in any sonic tool design. Otherwise, a sonic tool my not be able to provide accurate formation shear slowness measurements.

Mud slowness (DTm) has many other utilities, in addition to its use in the calculation of slow shear in quadrupole logging. For slow shear logging using dipole sources, the mud slowness is also needed in a way similar to that for quadrupole logging described above. For monopole source (for compressional (P) and fast shear (S)) logging), mud slowness (DTm) is used to set the slowness ranges for the P and S waves. These slowness ranges are used to guide the labeling algorithm in sonic log analysis. Mud slowness is also needed for computing the compressibility of borehole fluids in borehole mechanics and producibility applications.

Several approaches are possible for the measurement of mud slowness. One obvious way is to design a dedicated sensor to measure the downhole mud slowness directly. Such a sensor (sub-system) typically includes an ultrasonic pulse-echo measurement system exposed to the mud, e.g., on the outside of a drill collar. However, such sensors often cannot withstand the harsh conditions in the downhole environments. Furthermore, the high viscosity muds may include large sized rock cutting, which may result in the dispersion of sonic energies and render it difficult to ascertain whether the slowness measured at ultrasonic frequencies is the same as that measured at sonic frequencies.

Therefore, there exists a need for better methods and apparatus for the determination of mud slowness.

SUMMARY OF INVENTION

One aspect of the invention relates to methods for determining mud slowness of a mud in a borehole. A method in accordance with one embodiment of the invention includes determining slowness as a function of frequency for at least one fluid mode from a set of measurements acquired with a sonic tool in the borehole; and determining the mud slowness from the slowness as a function of frequency for the at least one fluid mode.

One aspect of the invention relates to systems for determining mud slowness of a mud in a borehole. A system in accordance with one embodiment of the invention includes a process and a memory, wherein the memory stores a program having instructions for determining slowness as a function of frequency for at least one fluid mode from a set of measurements acquired with a sonic tool in the borehole; and determining the mud slowness from the slowness as a function of frequency for the at least one fluid mode.

One aspect of the invention relates to methods for well logging. A method in accordance with one embodiment of the invention includes disposing a sonic tool in a borehole filled with a drilling mud; generating sonic signals covering a frequency range using a broad-band transmitter on the sonic tool, wherein the frequency range spans from 5 KHz to 500 KHz; acquiring a set of measurements using a receiver array disposed at a distance away from the transmitter on the sonic tool; determining slowness as a function of frequency for at least one fluid mode from the set of measurements; and determining mud slowness from the slowness as a function of frequency for the at least one fluid mode.

One aspect of the invention relate to downhole sonic tools. A downhole sonic tool in accordance with one embodiment of the invention includes a transmitter capable of generating signals covering a frequency range, a high end of which is more than 30 KHz; and a receiver array comprising a plurality of receivers, which are responsive to the frequency range of the transmitter, wherein the transmitter and the receiver array are spaced apart on a tool body at a selected TR spacing.

Other aspects and advantages of the invention will be apparent from the following description and the appended claims.

DETAILED DESCRIPTION

Embodiments of the invention relate to apparatus and methods for measuring mud slowness in a borehole. A method in accordance with embodiments of the invention comprises deriving mud slowness from the slowness of the fluid modes (especially, the lowest order fluid mode) at relatively high frequencies. While the fluid modes are routinely observed in sonic waveforms, they are often regarded as unwanted components and are typically removed during data processing. In contrast, embodiments of the invention make use of the fluid modes, especially at high frequencies. Methods of the invention may be practiced with sonic tools that are equipped with broad-band high-frequency sources.

Figure 1:
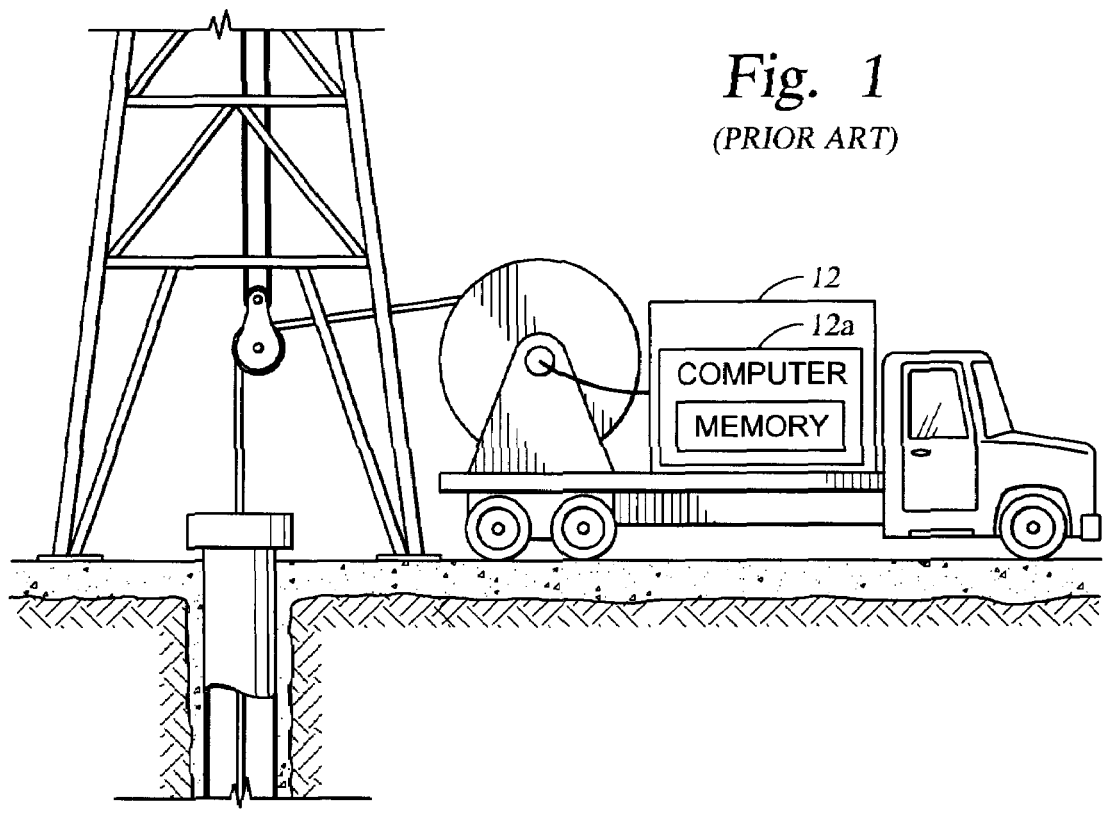
FIG. 1 shows a prior art sonic logging system.
Figure 1A:
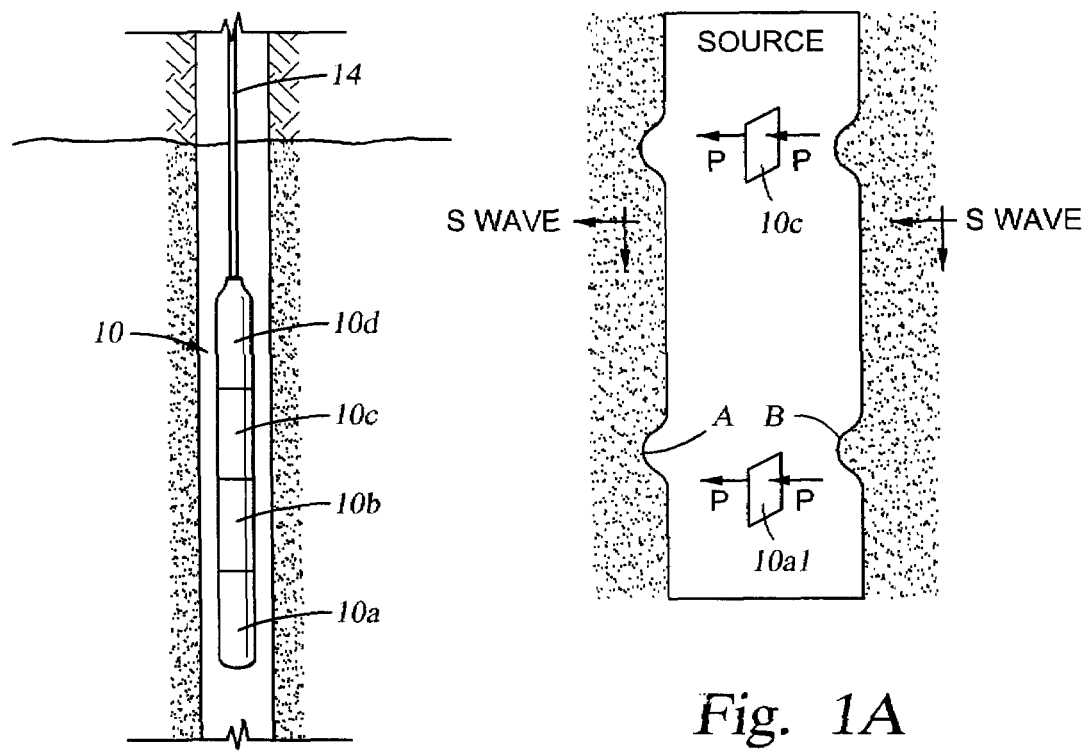
FIG. 1a illustrates a sonic logging using a conventional sonic tool in a borehole.

FIG. 1 shows a conventional sonic logging system. As shown, a sonic tool 10 is disposed in a borehole. A well logging truck 12 is connected to the sonic tool 10 via a cable 14. The truck 12 may include a computer 12a for analyzing data transmitted to the computer from the sonic tool 10. The tool 10, for example, may include a transmitter 10a, an isolator section 10b, a plurality of receivers 10c, and an electronics cartridge 10d. The transmitter 10a of the sonic tool 10 may include a monopole, a dipole, a quadrupole source, or higher order pole sources. FIG. 1a illustrates the function of a dipole transmitter. In FIG. 1a, the dipole transmitter creates a positive pressure wave A on one side of a piston 10a1 and a negative pressure wave B on the other side of the piston. The positive wave A and the negative wave B propagate up the formation to a receiver 10c. The receiver 10c transmits dipole waveforms to the well logging truck computer 12a via cable 14. The positive and negative waves A and B created by the dipole transmitter each may include a shear wave (S-wave), a compressional wave (P-wave) and a flexural wave. The sonic tool 10 of FIG. 1 is described in more detail in U.S. Pat. No. 5,036,945, entitled "*A Sonic Well Tool Transmitter and Receiver Array including an Attenuation and Delay Apparatus,*" issued to Hoyle et al. and assigned to the present assignee.

Figure 2:
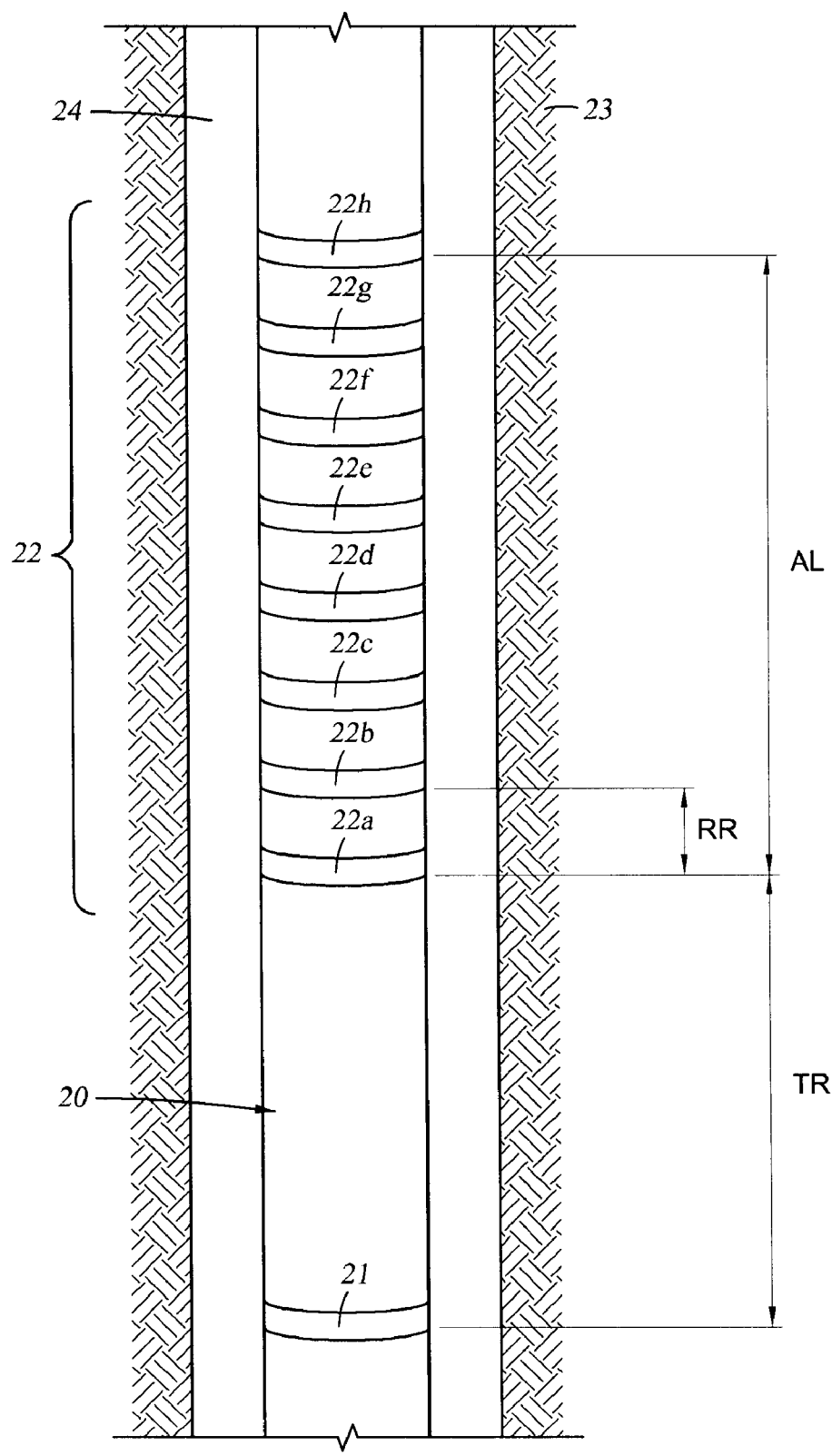
FIG. 2 shows a downhole sonic tool in accordance with one embodiment of the invention.

In accordance with embodiments of the invention, a sonic tool includes a transmitter capable of generating broad-band high-frequency signals and an array of transducers (receivers) optimized for measuring relatively high-frequency waveforms. FIG. 2 shows a sonic tool (wireline or LWD tool) in accordance with one embodiment of the invention. As shown a sonic tool 20 is disposed in bore-hole 24 that penetrates a formation 23. The sonic tool 20 includes a transmitter 21 and a receiver array 22 that comprises 8 receivers 22a 22h. The transmitter and receivers may be of piezoelectric or other types of transducers. One of ordinary skill in the art would appreciate that the number of receivers in the array is only for illustration and is not intended to limit the scope of the invention.

The transmitter 21 preferably is a broad-band transmitter that can operate in a relatively wide frequency range that covers relatively high frequencies. To efficiently excite fluid modes for determining mud slowness, the high ends of the frequency ranges (e.g., 30 KHz or higher) provided by a transmitter of the invention are typically higher than those (typically up to 20 KHz) used in a conventional sonic tool. For example, some embodiments of the invention can transmit signals from 0 KHz to 30 KHz, while other embodiments of the invention may be capable of even broader and higher frequency ranges, such as from 5 KHz to 500 KHz. Preferred embodiments of the invention can transmit signals from 10 KHz to 100 KHz.

In some embodiments of the invention, the frequencies used are optimized for the specific type of formation and borehole under investigation such that more energy is transmitted at the frequency range that can efficiently excite the fluid modes in the particular formation-borehole combination. The transmitter 21 may be a monopole, dipole, quadrupole, or higher order pole source. Similarly, the receivers (transducers) 22 in the array preferably are responsive to the relative high frequencies and wide frequency range, as the transmitter 21. The receiver may a monopole, dipole, quadrupole, or higher order pole receiver. It may be preferable that the receiver type match that of the transmitter.

The spacing between the transmitter 21 and the first receiver 22a, TR, could vary in a wide range, but preferably from 3 to 20 ft. A TR shorter than 3 ft may not provide sufficient room for the fluid mode to set up. A TR longer than 20 ft would require a large transmitter power, which is limited under down hole conditions.

The inter-receiver spacings RR should be as small as practicable to reduce the aliasing effects. Because the transmitter 21 of the sonic tool 20 is designed to transmitter relatively high frequency signals, the inter-receiver spacings RR may be smaller than the corresponding spacings on a conventional sonic tool. In some embodiments of the invention, the RR spacings may range from 0.05 ft to 1 ft, preferably from 0.1 ft to 0.4 ft.

The array length (AL), i.e., the length of the receiver array, may also vary in a wide range. The SL preferably ranges from 2–5 ft [0.61–1.5 m]. A preferred tool in accordance with embodiments of the invention ideally has a large AL and a small RR. However, the number of receivers on such an ideal tool would be large, which would be costly and may pose design issues. Therefore, the number of the receivers and the RR spacings should be selected such that the tool has a good performance, but without excessive costs. In some embodiments of the invention, the RR spacings are in the range of from 0.05 ft [0.015 m] to 1 ft [0.3 m], preferably from 0.1 ft [0.03 m] to 0.4 ft [0.012 m], and the number of receivers in the array ranges from 3 to 100, preferably from 4 to 30. For example, an 8-receiver array with 0.4 ft [0.012 m] RR spacing is found to provide very good results.

The above-described transmitter and receiver system need not be a system exclusively for mud slowness measurement. In fact, a good economical design is to incorporate a broad-band transducer and data acquisition system for mud slowness measurement into a conventional tool such that the same hardware system could be used for both regular sonic slowness measurements (P & S slowness) in the 0–20 KHz range as well as for mud slowness (through fluid modes) measurements in the higher frequency range (e.g., 10–100 KHz range). Some embodiments of the invention are equipped with a source and a receiver array capable of both regular slowness measurements and mud slowness measurements. The mud slowness measurements (with broad-band higher frequency pulses) may be operated in a same or different firing cycle from that for the regular P & S wave measurements.

Some embodiments of the invention relate to methods of measuring mud slowness in a borehole. A method of the invention may include the use of a sonic tool equipped with broad-band high-frequency transducers to perform sonic logging in a borehole. The broad-band high-frequency logging is designed to excite various fluid modes in a frequency region where the slowness of the fluid modes approaches the slowness of the mud. Once, the measurement data are available, the fluid modes in the measurement data are identified. Next, the mud slowness is determined from the slowness of various fluid modes in the high frequency region.

Methods of the invention are based on the discovery by the inventor that the slownesses of various fluid modes are limited by the mud slowness in the high frequency range. Thus, the slowness dispersion curves of various fluid modes will asymptotically approach a limiting value (mud slowness) in the high frequency region. Accordingly, the slowness limit that represents the upper limit of the various fluid mode slowness dispersion curves may be regarded as the mud slowness. One of ordinary skill in the art would appreciate that various methods may be devised to find this limit. For example, a mud slowness extraction algorithm may be based on finding the slowness of a wave component (fluid mode) that has the flattest dispersion curve in a given frequency range defined by $[f_{min}\ f_{max}]$ and within a given mud slowness range defined by $[S_{min}\ S_{max}]$.

Figure 3:
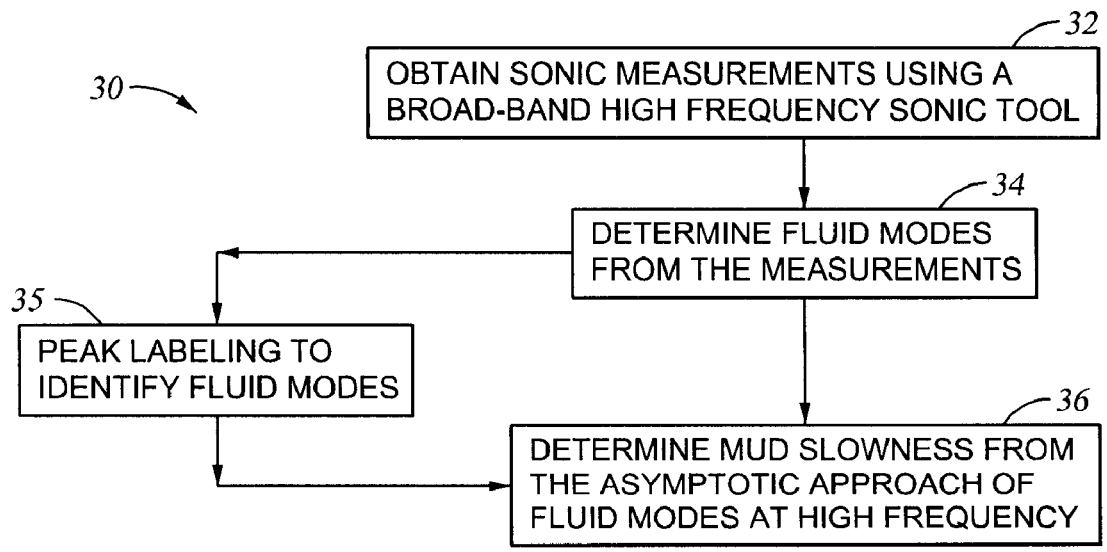
FIG. 3 shows a method for determining mud slowness in accordance with one embodiment of the invention.

FIG. 3 shows a schematic of a method for determining mud slowness in accordance with one embodiment of the invention. As shown, a method 30 includes the step of acquiring measurements using a tool capable of broad-band high-frequency measurements, such as the one described above (step 32). The measurements include those at frequencies high enough to permit deriving the mud slowness from fluid mode asymptotes. Typically, the frequency range includes from about 5 KHz to about 500 KHz, preferably from about 10 KHz to about 100 KHz. Next, various fluid modes and their slownesses as functions of frequencies are determined from the measurement data (step 34). The steps involved in this determination will be described in more detail with reference to FIG. 4. These fluid modes may include Stoneley waves. These results may be plotted as slowness versus frequency to show the changes of the slownesses of various fluid modes as a function of excitation frequencies. Once these parameters are determined, the mud slowness can then be found from the asymptotic approaches of various fluid modes to a limiting values, which represents the mud slowness (step 36). In some embodiments, the method may further include a step to label (or identify) fluid modes to be used to determine the mud slowness (step 35). The labeling steps prevents mistaking Stoneley wave for a fluid mode, especially in a fast formation with a small borehole. This is discussed in detail with respect to FIG. 7 below.

Figure 4:
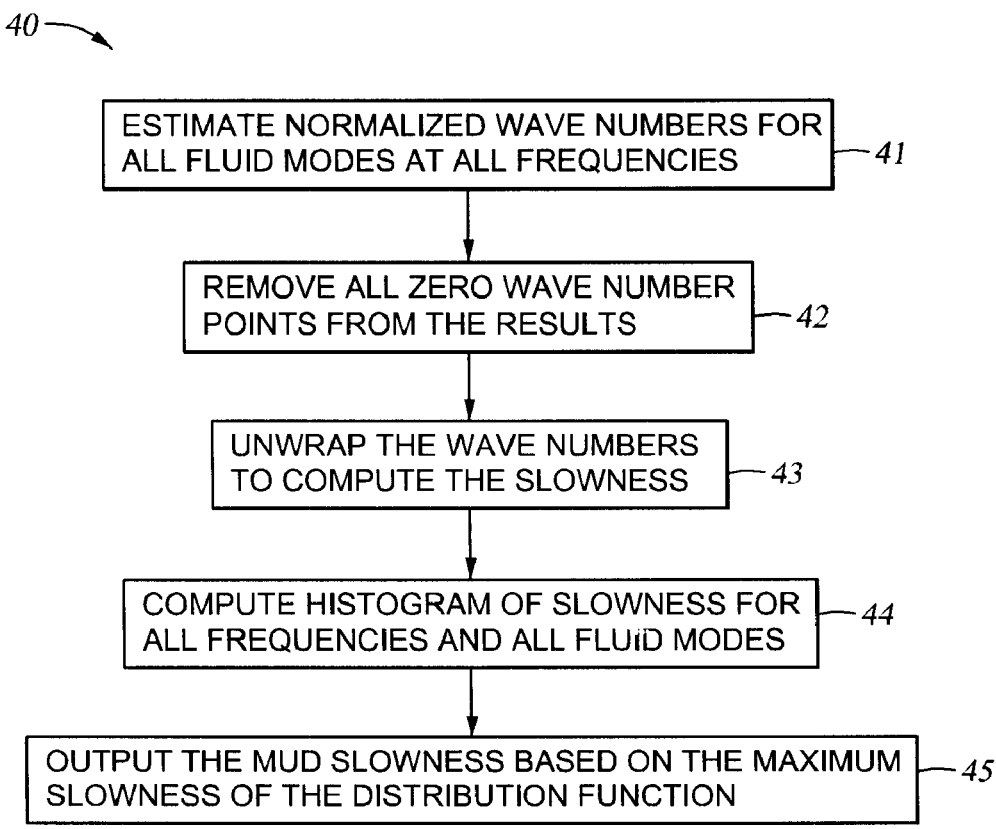
FIG. 4 shows a method for determining mud slowness in accordance with one embodiment of the invention.

FIG. 4 shows a method 40 for determining the various fluid modes from the measurement data (e.g., step 34 in FIG. 3). As shown, the process begins with estimating normalized wave numbers for all fluid modes at all frequency components (step 41). The estimation may use any method known in the art, including Prony's method. See Parks et al., *"Digital Filter Design,"* pp. 226–228, Wiley & Sons, New York, 1987. The normalized wave numbers are estimated for all fluid modes at all frequency components and for all frequencies within the frequency range used in the measurements. Because the receivers in the array are designed to provide at least two waveform measurements for the highest frequency component, the maximum number of wave numbers is typically no more than one half the number of receivers (or waveforms measured). For example, the wave numbers, $K_j(f_i)$, are estimated for all fluid modes $j=1, \ldots, n$ at all the frequency components centered at frequency $f_i$, where $n \leq$ (number of array waveforms)/2 and $f_{min} < f_i < f_{max}$ ($f_{min}$ and $f_{max}$ may be the minimum and maximum frequencies used in the measurements).

The normalized wave numbers, $K_j(f_i)$, thus estimated are inspected and any zero value points may be removed to simplify the analysis (step 42). Although removal of zero value points would simplify later processes, this step is optional.

To counter the aliasing effects, the normalized wave number may need to be unwrapped several times in order to obtained the correct slowness associated with the wave number. In step 43, based on the maximum expected mud slowness $S_{max}$ and the maximum frequency $f_{max}$ used in the measurements, the umber of warps needed to unwrap the normalized wave numbers, $K_j(f_i)$, is computed. The maximum number of wraps (m__max) needed is given by:

$$m\_\max = \text{ceil}(f_{max} \times RR \times S_{max} - 1) \quad (1)$$

where ceil stands for rounding the value up to the next higher integer and RR is the inter-receiver spacing (see FIG. 2). The normalized wave numbers are then unwrapped in order to compute the corresponding slowness, $S_{jm}(f_i)$.

Once the normalized wave numbers are "unwrapped," the slowness for various wave components can be calculated (step 44). This is accomplished by computing the slowness for each wave component, $S_{jm}(f_i)$, at each frequency $f_i$ for each wrap m from the normalized wave number $K_j(f_i)$ at frequency component $f_i$ according to:

$$S_{jm}(f_i) = ((K_j(f_i) + m)/RR)/f_i, \quad (2)$$

where j=1, . . . , n; and m=0, 1, . . . , m__max.

Next, the method may include computing a histogram of $S_{jm}(f_i)$, for all $f_i$, j, and m (step 45). As noted above, the various fluid mode slownesses approach asymptotically to a value limited by mud slowness. Therefore, the slowness at the maximum of the distribution function (from the histogram) may be outputted as the mud slowness. The distribution function itself may also be outputted for quality control purpose, similar to the S/T projection from STC processing.

Due to noise, aliasing, or Stoneley wave interference, it is possible that the slowness at the maximum of the distribution is not the mud slowness. This is especially true for fast formation and small borehole conditions. With the distribution function as a quality control, it is possible to discern when this situation is likely encountered. If this situation is suspected to have been encountered, it is possible to use additional information (either from the adjacent depths or from known external constraints) to "relabel" (select) the slowness of another fluid mode (at a lesser peak of the distribution function) to derive the mud slowness.

Figure 5A:
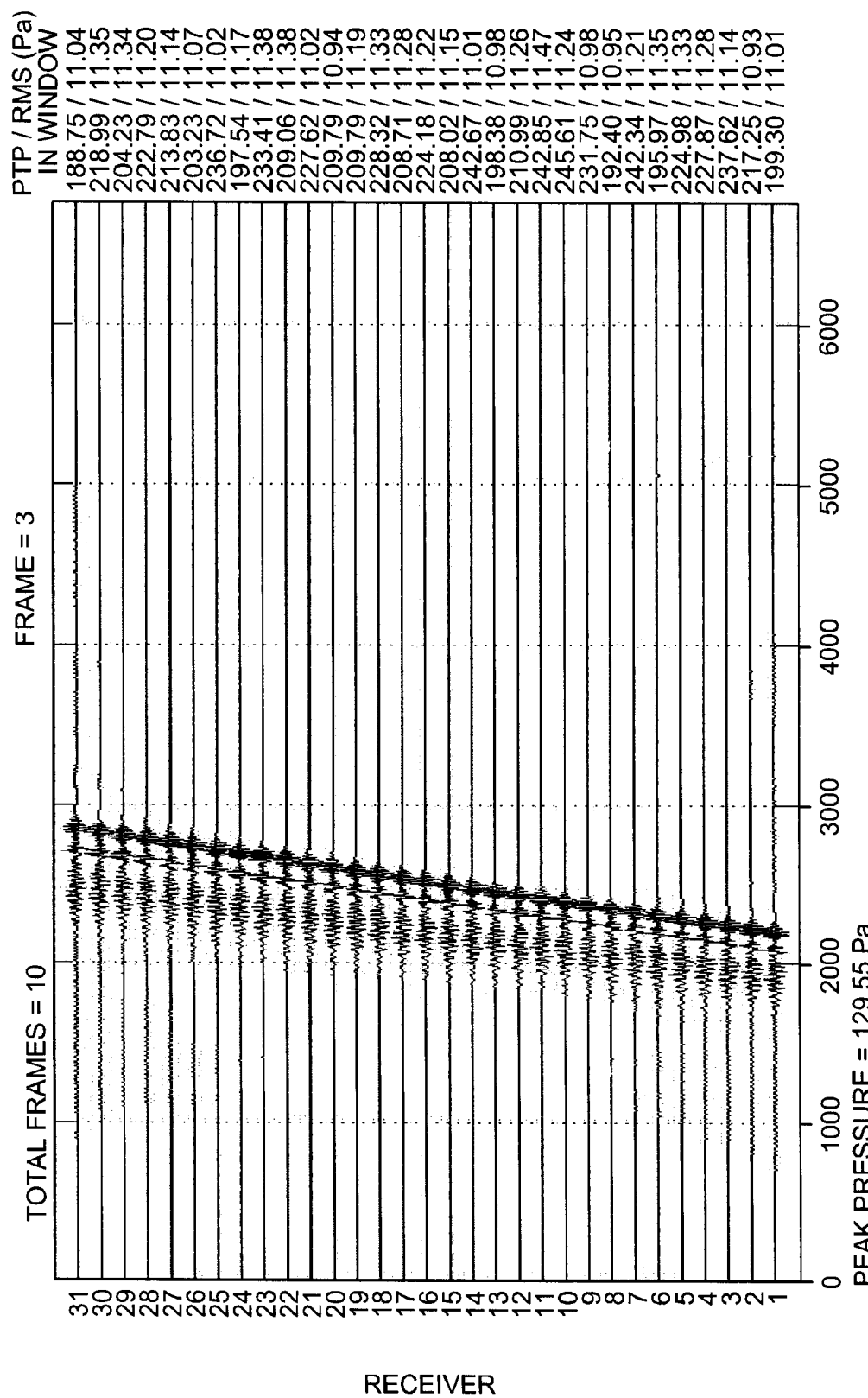
FIG. 5 shows one example of determining mud slowness using a method in accordance with one embodiment of the invention.
Figure 5B:
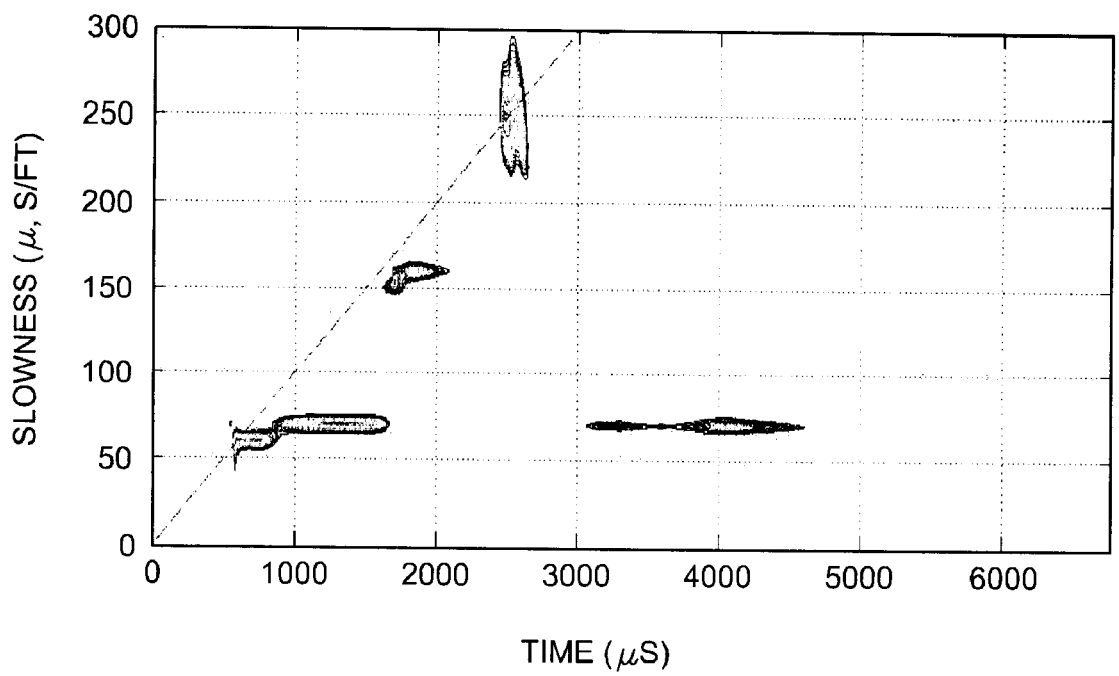
Figure 5C:
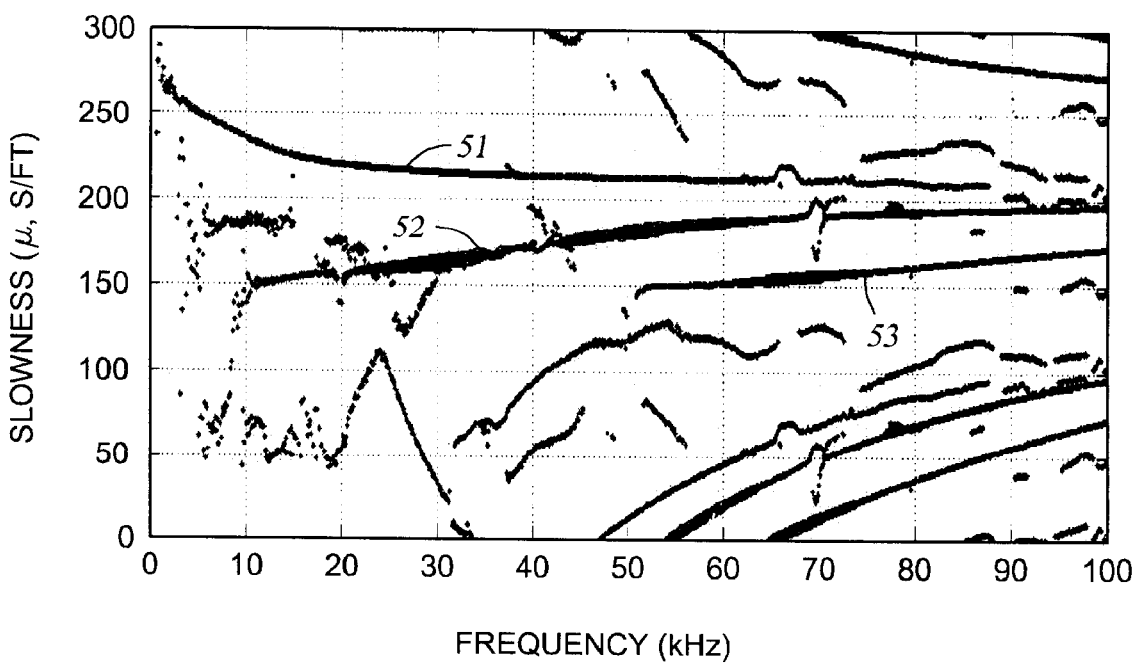
Figure 6A:
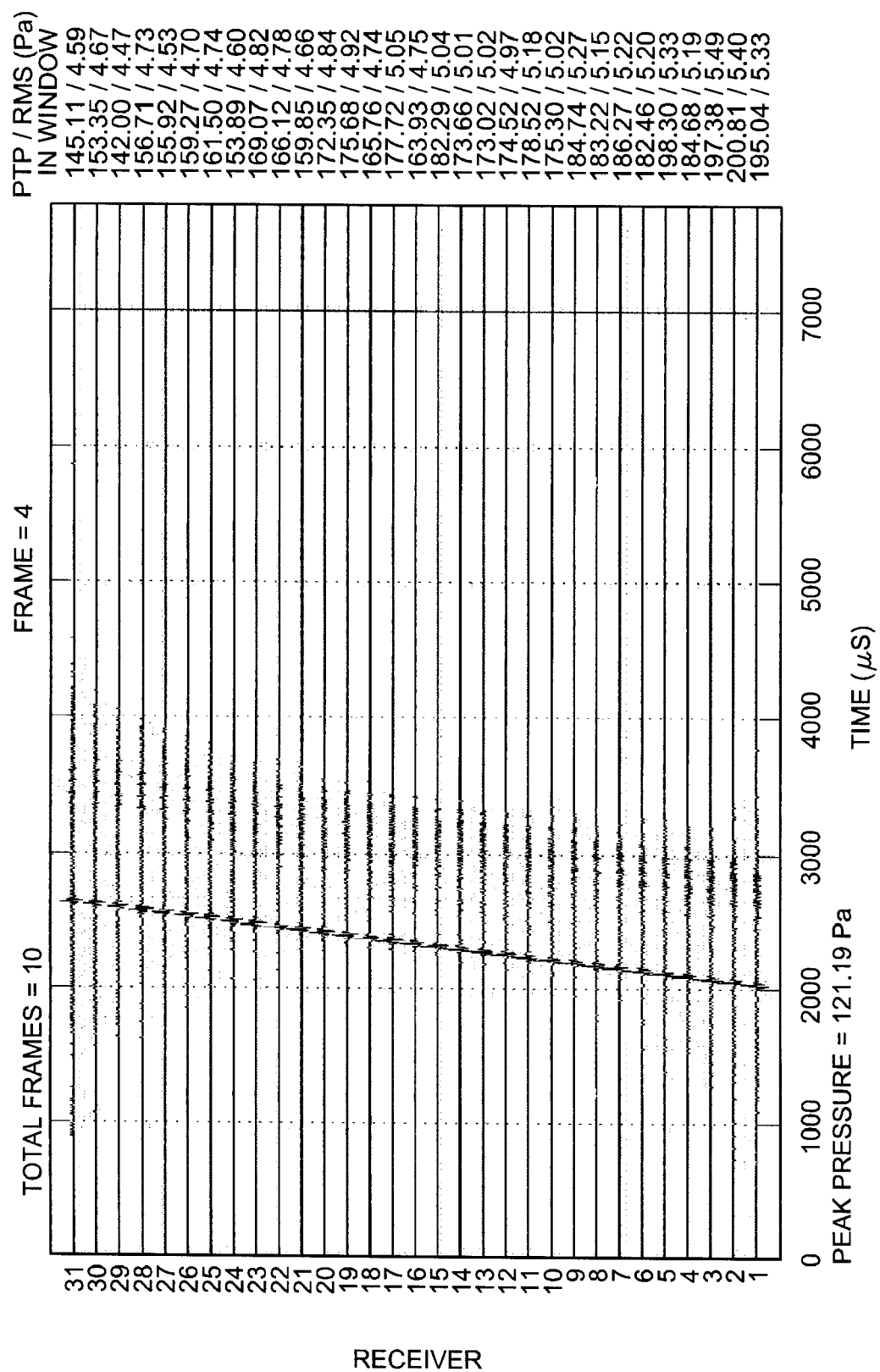
FIG. 6 shows another example of determining mud slowness using a method in accordance with one embodiment of the invention.
Figure 6B:
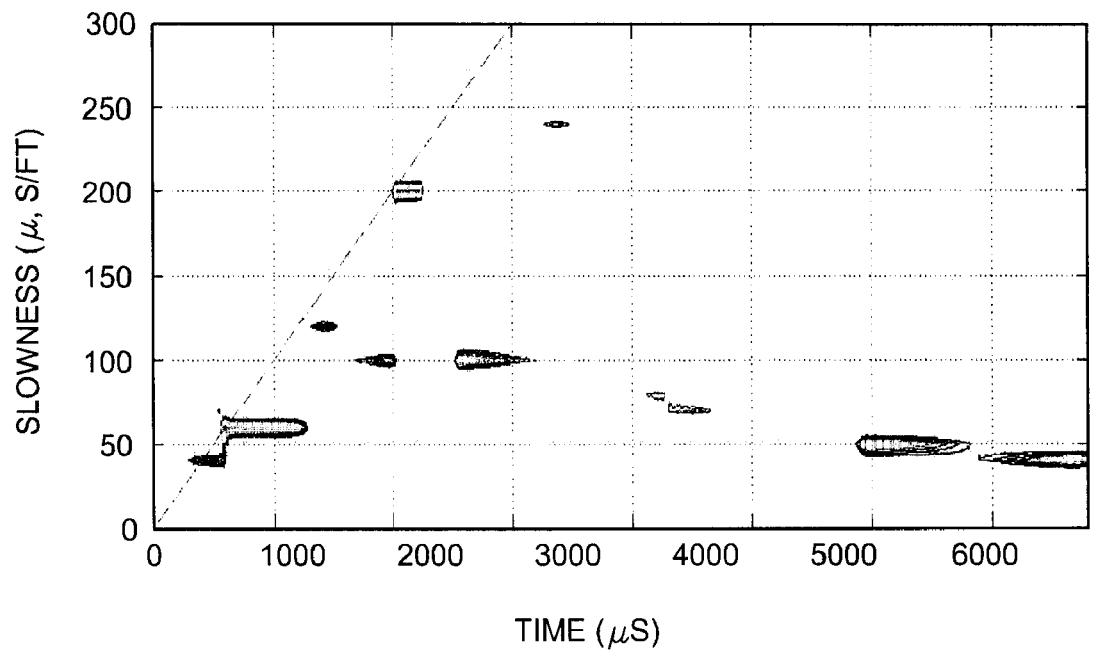

The application of embodiments of the invention is illustrated in FIGS. 5 and 6, which show results from two very different situations. FIG. 5 shows the results for the case of a sonic tool on a 6.75 inch [17 cm] drill collar in a small borehole (HD=8.62 inches [21.9 cm], DTm=200 us/f) penetrating a fast formation (DTc=70 us/f, DTs=150 us/f). FIG. 6 shows the results for the case of a sonic tool on a 6.75 inch [17 cm] drill collar in a large borehole (HD=12.5 inches [31.7 cm], DTm=200 us/f) penetrating a slower formation (DTc=100 us/f, DTs=300 us/f). In both figures, the top plots (A) show the model waveforms as recorded by the receiver arrays, the middle plots (B) are the slowness-time planes showing the slownesses and times of various wave components detected by semblance processing (see Kimball et al., Geophysics, Vol. 49, pp. 264–281, 1984), and the bottom plots (C) are the dispersion curves extracted from the model waveforms using the Prony's method in accordance with one method of the invention (e.g., method 40 in FIG. 4).

FIG. 5C shows that the Stoneley wave (curve 51) and two fluid modes (curves 52 and 53) are prominently excited. In addition, several other fluid modes are also discernable from the plot. It is apparent from this plot that most of the fluid modes are not excited until the source frequencies are relatively high. For example, the lowest order fluid mode (curve 52) is excited by frequencies of 10 KHz and higher, while the other fluid mode (curve 53) is not excited by frequencies lower than 50 KHz. Thus, some of these fluid modes are not detected using a conventional sonic tool.

FIG. 5C also shows that the slowness of the lowest order fluid mode (curve 52) starts around 150 us/f (which is the shear slowness for this case) at around 10 KHz and gradually increases with the increasing frequencies. The fluid mode slowness gradual increases and asymptotically approaches a limiting value, the mud slowness, in the 80–100 KHz range. This maximum value can be identified by various methods, e.g., curve fitting the dispersion curve 52 or using a histogram (e.g., step 44 in FIG. 4).

Similarly, other fluid modes (e.g., curve 53) may also be used to determine mud slowness. However, in most cases, the lowest order fluid mode (curve 52) is preferred because it is most prominently excited, is excited at relatively lower frequencies, and approaches the mud slowness at relatively lower frequencies.

Note that FIG. 5C shows that the mud slownesses of both curve 52 and curve 53 fluid modes are bounded above by the Stoneley wave slowness (curve 51). The Stoneley wave is prominently excited in most sonic logging operations. Therefore, the Stoneley wave dispersion curve can always be used to provide an upper bound of the mud slowness, even if no other fluid modes are discernable.

Figure 6C:
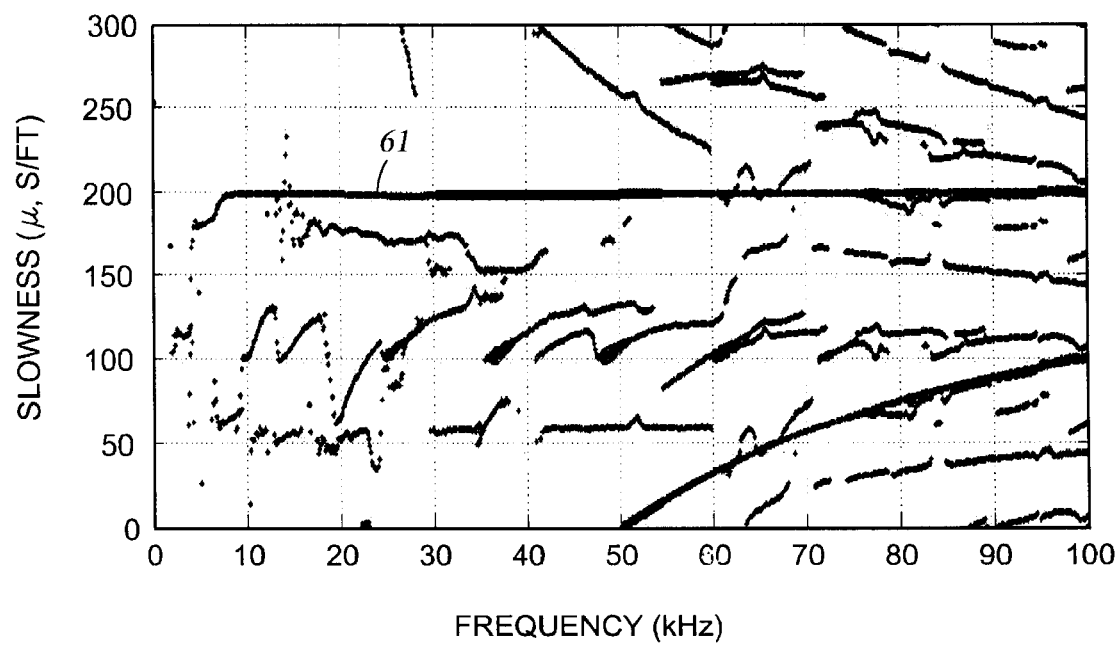
Figure 7A:
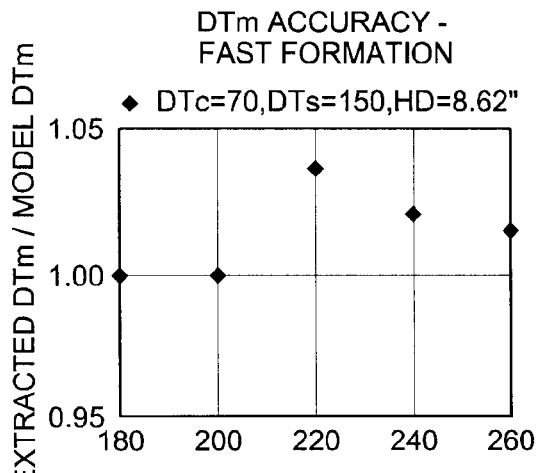
FIG. 7 shows results from simulation illustrating accuracies of mud slowness determined by a method in accordance with one embodiment of the invention under various formation-borehole conditions.
Figure 7B:
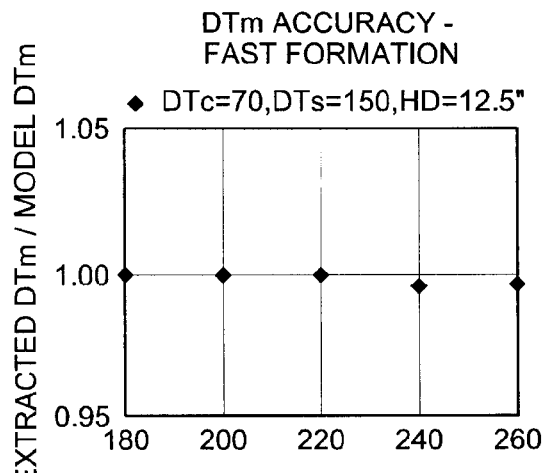
Figure 7C:
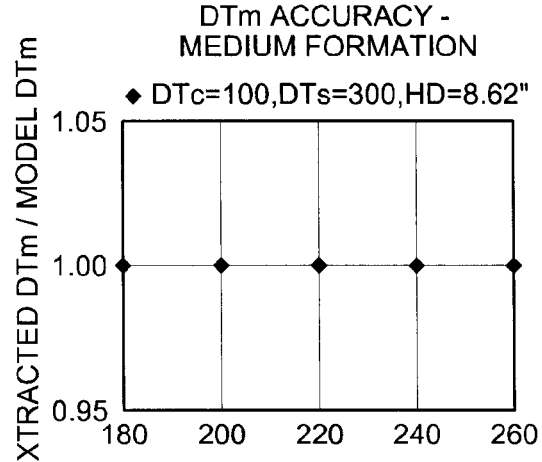
Figure 7D:
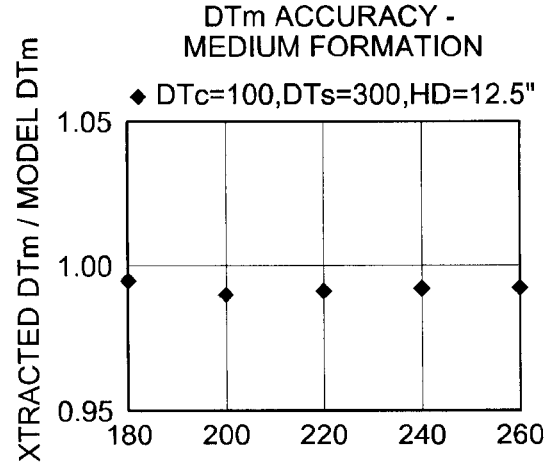
Figure 7E:
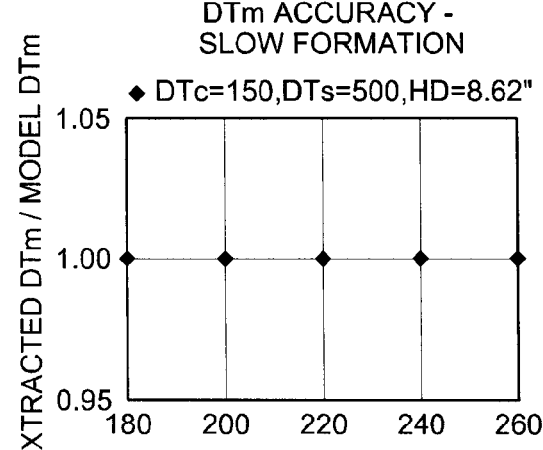
Figure 7F:
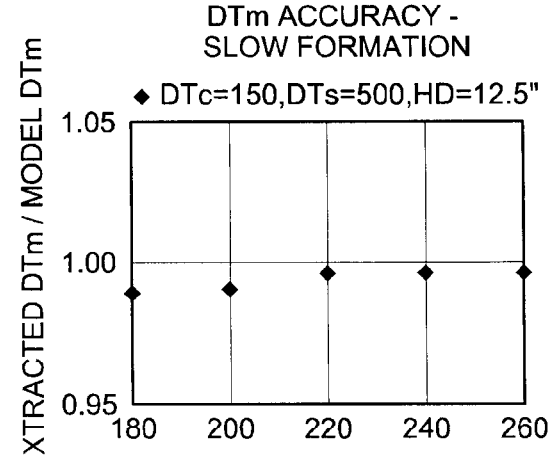
Figure 8A:
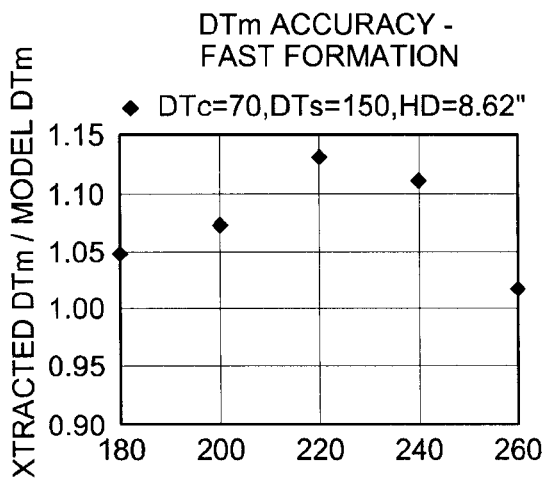
FIG. 8 shows results from simulation illustrating accuracies of mud slowness determined by a method in accordance with one embodiment of the invention under various formation-borehole conditions.
Figure 8B:
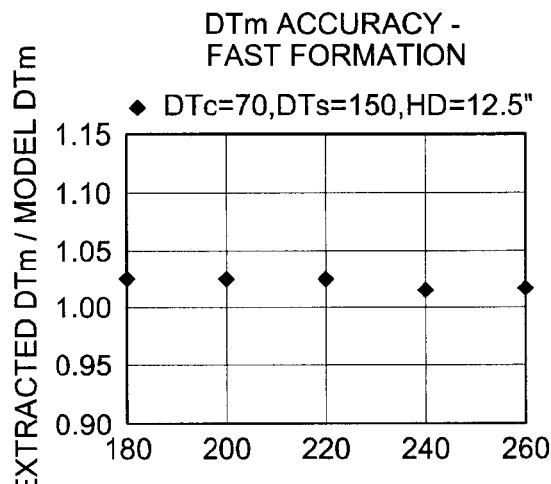
Figure 8C:
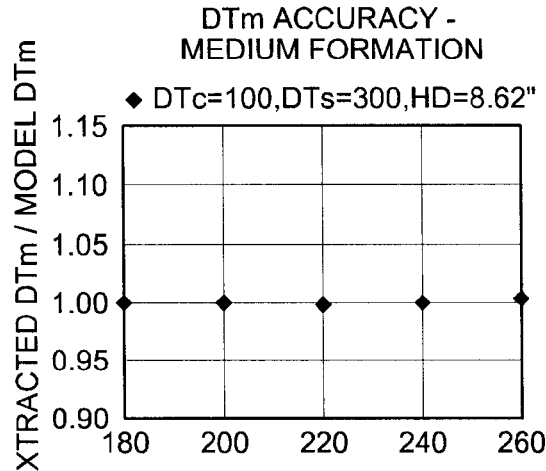
Figure 8D:
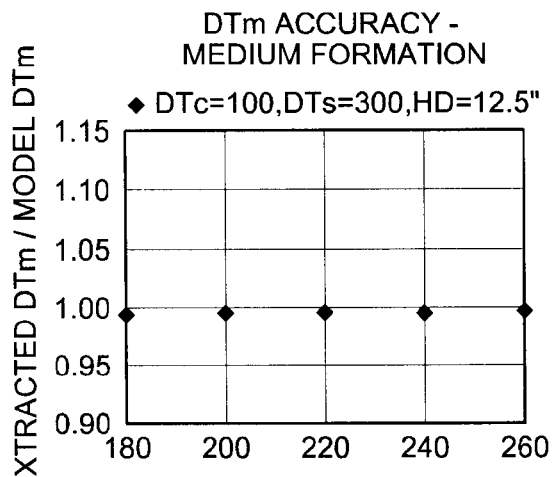
Figure 8E:
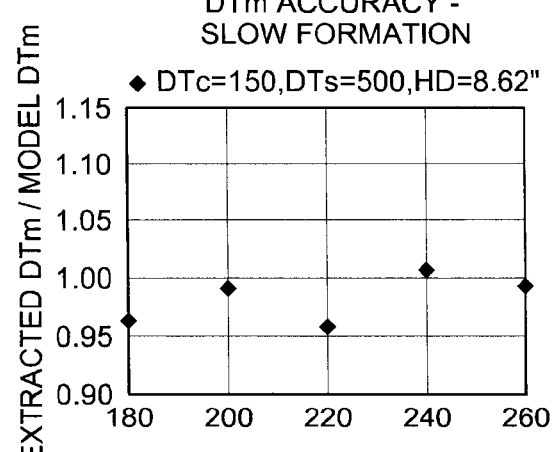
Figure 8F:
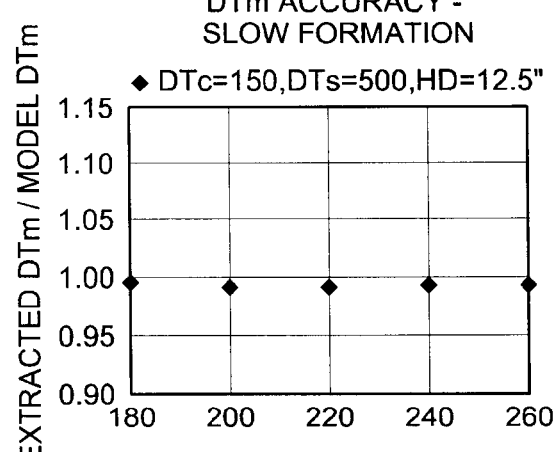

The results shown in FIG. 5C are for a fast formation and small borehole, a situation that requires higher excitation frequencies to reveal the asymptotic approach of the fluid mode to the mud slowness. In contrast, FIG. 6C shows results for a slow formation and a larger borehole, a situation where more sonic energy is transmitted by the mud column. As shown in FIG. 6C, the lowest order fluid mode dispersion curve (curve 61) reaches the mud slowness in the 10 KHz range, much lower than that required in the situation shown in FIG. 5C. This is because various fluid modes are more efficiently excited by the sonic source when the formation is slow and the borehole is relatively large. Results shown in FIGS. 5C and 6C are representatives of two extremes that are likely to be encountered in sonic logging operations. Most wells will probably fall between these two cases.

To demonstrate general applicability of embodiments of the invention, simulations were performed using waveforms from a LWD sonic tool in the center of a mud filled borehole through various formations. Three formations, five mud slownesses, and two borehole diameters are used in the modeling. The values of properties for the formation, mud, and borehole used in these simulation are listed in Table 1. There are a total of 30 different cases for various combinations of formation slowness, mud slowness, and borehole size.

TABLE 1

Parameter values for model waveforms.

| Formation (3 cases) | | | Mud (5 cases) | | Borehole |
|---|---|---|---|---|---|
| DTc (us/f) | DTs (us/f) | Rhob (g/cc) | DTm (us/f) | Rhom (g/cc) | Diameter (in) |
| 70 | 150 | 2.3 | 180 | 1.3 | 8.62 [21.9 cm] |
| 100 | 300 | 2.3 | 200 | 1.3 | 12.5 [31.7 cm] |

TABLE 1-continued

Parameter values for model waveforms.

| Formation (3 cases) | | | Mud (5 cases) | | Borehole |
|---|---|---|---|---|---|
| DTc (us/f) | DTs (us/f) | Rhob (g/cc) | DTm (us/f) | Rhom (g/cc) | Diameter (in) |
| 150 | 500 | 2.3 | 220 | 1.3 | — |
| — | — | — | 240 | 1.3 | — |
| — | — | — | 260 | 1.3 | — |

The ID and OD of the LWD collar are 4.75 inches [12 cm] and 6.70 inches [17 cm], respectively. These values are typical for the 6.75 inch [17.1 cm] collar commonly found in the LWD tools. The TR is 10 ft [3 m] and AL is 3 ft [0.9 m] for the modeled waveform array. The sampling time interval ($\Delta t$) is 4 us and the RR is 0.1 ft [0.03 m] for the densely sampled waveforms. The noiseless densely sampled waveforms represent an ideal condition for the mud slowness measurements. The three formations represent typical fast, medium and slow formations, respectively. The 5 mud slownesses cover the full range of possible mud slowness from the very fast water-based mud to the very slow oil-based mud. These are the mud slowness outside the collar. Due to the inclusion of rock cutting and possibly gas outside of the collar, the mud inside the drill collar may have a slowness different from that outside of the collar. For the simulations, it was assumed that inside mud slowness is 15% faster than that outside of the collar. Generally, the fluid modes that propagate in the annulus outside the collar are dominated by the properties of the outside mud. The two borehole diameters represent the hole sizes made by the normal and the largest bit size for the 6.75 inch [17.1 cm] collar. For the fast and medium formations, the source is a broad-band monopole source having a center frequency at 50 KHz. For slow formation, the source is a broad-band monopole source centered at 30 KHz.

FIG. 7 illustrates the accuracies of the extracted mud slowness from the noiseless and densely-sampled waveforms for all the test cases. The plots in FIG. 7 express the accuracies in terms of the ratio of extracted DTm (as extracted with a method of the invention) to the underlining model DTm. Panels A and B represent fast formations with a small borehole (HD=8.62 inch [21.9 cm]) and a large borehole (HD=12.5 inches [31.7 cm]), respectively. Panels C and D represent medium formations with a small borehole (HD=8.62 inch [21.9 cm]) and a large borehole (HD=12.5 inches [31.7 cm]), respectively. Panels E and F represent slow formations with a small borehole (HD= 8.62 inches [21.9 cm]) and a large borehole (HD=12.5 inches [31.7 cm]), respectively.

The results shown in FIG. 7 indicate that under ideal conditions (no noise), the mud slowness extraction algorithm is accurate to within 1% for all cases (panels B–F), except for the fast formation and small borehole case (panel A). For the fast formation and small borehole case (panel A), some of the extracted mud slownesses are higher (slower), by up to 4%, than the correct value. These higher estimated values likely reflect the slowness of Stoneley wave, which are more favorably excited under the fast formation and small borehole conditions. This error can be avoided if proper fluid modes are identified for mud slowness determination. Therefore, in some embodiments of the invention, a method may further include a peak labeling step (step 35 in FIG. 3) to select the proper peak (a proper fluid mode peak instead of the Stoneley peak) in the slowness distribution to estimate the mud slowness. This labeling step may use external information and/or log history in the same well across many frames (time frames or regions) to provide a more robust answer.

FIG. 7 shows the ideal situations, where there are no noises in the measurement signals. In real measurements, the signals are contaminated with noises from various sources. To test the utility of the methods in accordance with embodiments of the invention in real applications, the tests are also performed with simulated measurements containing noises. FIG. 8 shows the accuracies of the extracted mud slowness for test cases representing poor measurement conditions, such as down-sampled waveforms with added random noises.

The results shown in FIG. 8 are for measurements obtained with a sampling time interval ($\Delta t$) of 8 us and 0.4 ft [0.012 m] RR spacing for the down-sampled waveforms. The 8 us time sampling interval and 0.4 ft [0.012 m] RR spacing reflect what can easily be achieved by a practical downhole tool design. In addition, random noises having amplitudes of 30 dB relative to the peak amplitudes of the waveforms are added in these simulations. The 30 dB noise level used in these simulations probably represents the higher end of noise levels that are likely to be encountered by a downhole tool under normal operation conditions.

In FIG. 8, panels A and B represent fast formations with a small borehole (HD=8.62 inch [21.9 cm]) and a large borehole (HD=12.5 inch [31.7 cm]), respectively. Panels C and D represent medium formations with a small borehole (HD=8.62 inch [21.9 cm]) and a large borehole (HD= 12.5 inch [31.7 cm]), respectively. Panels E and F represent slow formations with a small borehole (HD=8.62 inch [21.9 cm]) and a large borehole (HD=12.5 inch [31.7 cm]), respectively.

Under these "realistic" conditions, the mud slowness extraction algorithm in accordance with one embodiment of the invention is accurate to within 5% error for all the cases (panels B–F), except for the fast formation and small borehole case (panel A). For the fast formation and small borehole case (panel A), some of the extracted mud slownesses are higher (slower) than the correct value by up to 13%. Again, this is most likely due to the dominance of the Stoneley wave. This problem can be alleviated if the method includes a step to label (identify) fluid modes (step 35 in FIG. 3) so that the correct fluid mode are used to determine the mud slowness, as discussed above.

A mud slowness with 5–13% error is quite adequate for providing guidance to the slowness range of the P and S waves in the monopole logging labeling algorithm. A mud slowness with an error of 5% is also adequate as an input parameter for deriving the dispersion curves for dipole (mostly wireline) and quadrupole (mostly LWD) slow shear logging. The effects of larger error of 13% in the fast formation and small borehole conditions may be mitigated using direct monopole shear slowness measurements, which usually can be obtained under this condition without using a dipole or a quadrupole source.

Figure 9:
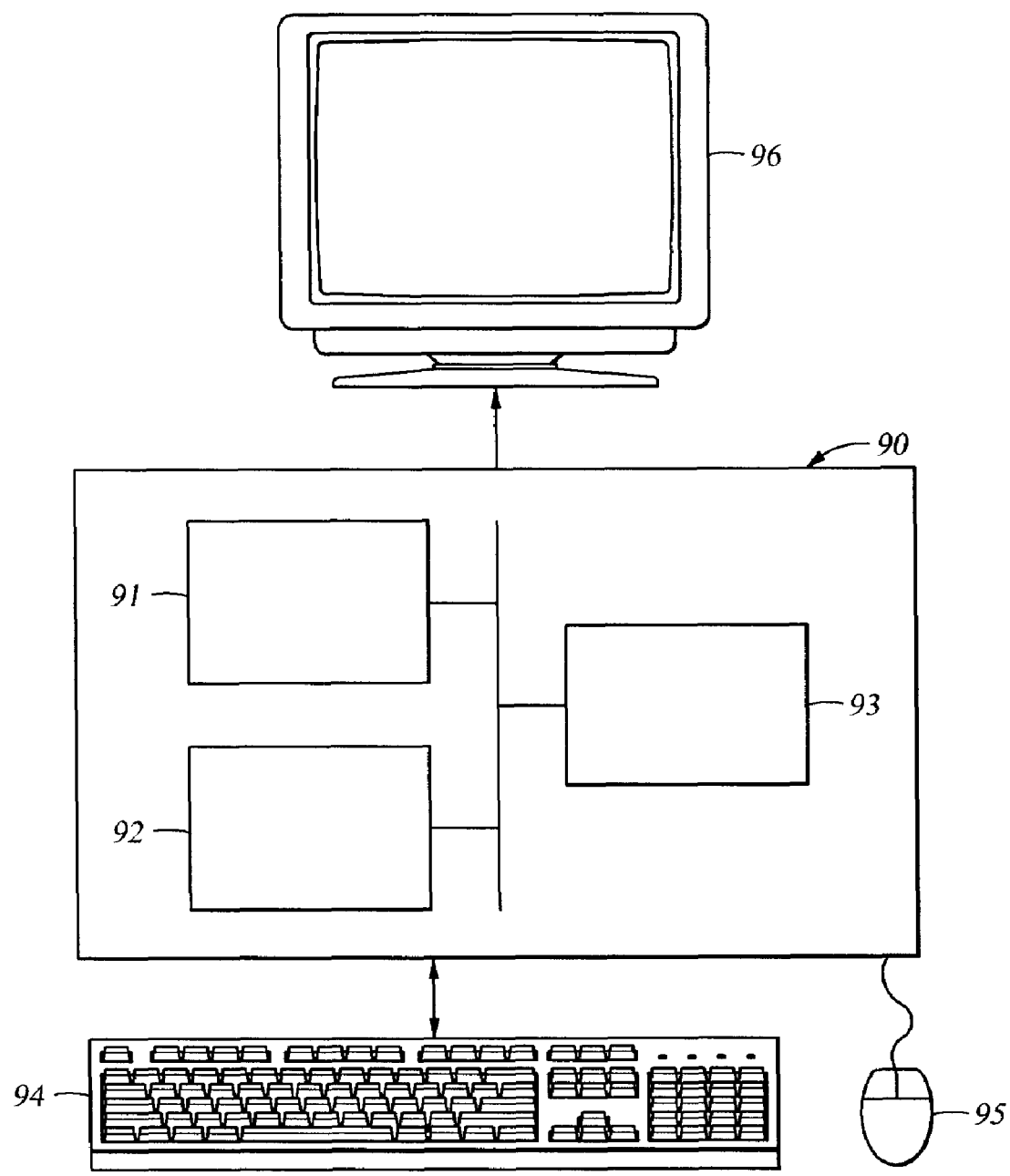
FIG. 9 shows a prior art computer system that can be used with embodiments of the invention.

Some embodiments of the invention relate to systems for determining mud slowness from sonic log. A system in accordance with embodiments of the invention may use a general computer as shown in FIG. 9 or a processor included in a downhole tool. As shown in FIG. 9, a general computer 90 may include a processor 91, a storage medium 92 (e.g., a hard drive), and a random-access memory 93, in addition to input devices (e.g., keyboard 94 and mouse 95) and output devices (e.g., CRT display 96). The memory 92 stores a program having instructions for performing a method of the invention as described above. In addition, some embodiments of the invention relate to recoding media storing a program that includes instructions for performing a method of the invention. The recording media may be any suitable media known in the art, including a hard disk, diskette, CR-ROM, flash memory, etc.

Advantages of the invention may include one or more of the following. Some embodiments of the invention provide improved sonic tools that can provide better waveform measurements for deriving mud slowness. Some embodiments of the invention provide methods that can be used to derive mud slowness form waveform measurements obtained with a conventional sonic tool or a tool in accordance with embodiments of the invention. A method of the invention makes use of fluid mode information in a sonic log that are traditionally discarded as annoyance. A method of the invention can provide accurate mud slowness measurement, which can be used to improve the accuracy of sonic log inversion.

While the invention has been described with respect to a limited number of embodiments, those skilled in the art, having benefit of this disclosure, will appreciate that other embodiments can be devised which do not depart from the scope of the invention as disclosed herein. For example, while it is desirable to obtain the sonic measurements using a tool capable of broad-band high-frequency excitations, the use of such a tool is not necessary in most situations (except for fast formation and small borehole condition). Accordingly, the scope of the invention should be limited only by the attached claims.

What is claimed is:

1. A method for determining mud slowness of a mud in a borehole, comprising:
   determining slowness as a function of frequency for at least one fluid mode from a set of measurements acquired with a sonic tool in the borehole; and
   determining the mud slowness from the slowness as a function of frequency for the at least one fluid mode.

2. The method of claim 1, wherein the determining slowness as a function of frequency comprises:
   estimating normalized wave numbers for the at least one fluid mode;
   unwrapping the normalized wave numbers to compute slowness for the at least one fluid mode at all frequencies; and
   generating a histogram of slowness versus frequency for the at least one fluid mode.

3. The method of claim 2, wherein the determining the mud slowness is by identifying a maximum slowness from the histogram.

4. The method of claim 2, further comprising removing zero value wave numbers from the normalized wave numbers.

5. The method of claim 1, wherein the determining the mud slowness comprises determining a maximum slowness from an asymptotic approach of the slowness as a function of frequency in a high frequency region.

6. The method of claim 1, further comprising acquiring the set of measurements using the sonic tool in the borehole.

7. The method of claim 6, wherein the set of measurements comprise signals in a frequency range of 5 KHz to 500 KHz.

8. The method of claim 6, wherein the set of measurements comprise signals in a frequency range of 10 KHz to 100 KHz.

9. A system for determining mud slowness of a mud in a borehole, comprising a processor and a memory, wherein the memory stores a program having instructions for:
   determining slowness as a function of frequency for at least one fluid mode from a set of measurements acquired with a sonic tool in the borehole; and
   determining the mud slowness from the slowness as a function of frequency for the at least one fluid mode.

10. The system of claim 9, wherein the program further comprising instructions for:
    estimating normalized wave numbers for the at least one fluid mode;
    unwrapping the normalized wave numbers to compute slowness for the at least one fluid mode at all frequencies; and
    generating a histogram of slowness versus frequency for the at least one fluid mode.

11. The system of claim 10, wherein the determining the mud slowness is by identifying a maximum slowness from the histogram.

12. The system of claim 10, further comprising removing zero value wave numbers from the normalized wave numbers.

13. The system of claim 9, wherein the determining the mud slowness comprises determining a maximum slowness from an asymptotic approach of the slowness as a function of frequency in a high frequency region.

14. A method for well logging, comprising:
    disposing a sonic tool in a borehole filled with a drilling mud;
    generating sonic signals covering a frequency range using a broad-band transmitter on the sonic tool;
    acquiring a set of measurements using a receiver array disposed at a distance away from the transmitter on the sonic tool;
    determining slowness as a function of frequency for at least one fluid mode from the set of measurements; and
    determining mud slowness from the slowness as a function of frequency for the at least one fluid mode.

15. The method of claim 14, wherein the frequency range spans from 5 KHz to 500 KHz.

16. The method of claim 14, wherein the frequency range spans from 10 KHz to 100 KHz.

* * * * *